April 12, 1932.  R. F. KOHR  1,853,906
BRAKE
Filed Jan. 24, 1929   2 Sheets-Sheet 1

INVENTOR.
Robert F. Kohr
BY
P. W. Pomeroy
ATTORNEY

April 12, 1932.  R. F. KOHR  1,853,906
BRAKE
Filed Jan. 24, 1929   2 Sheets-Sheet 2

INVENTOR.
Robert F Kohr
BY Pomeroy
ATTORNEY

Patented Apr. 12, 1932

1,853,906

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 24, 1929. Serial No. 334,734.

This invention relates to vehicle brakes and particularly to means adapted to compensate for the wear of the brake lining.

In the past it has been the common practice to periodically adjust the brake element relative to the brake drum because of the wear of the brake lining and for other reasons. To adjust the braking element it has been necessary to manually change the position of cams, rollers or other stop mechanisms against which the brake element seats when in inoperative position. The so-called adjustment of the brakes requires considerable time and it has been found that the operator of the vehicle often waits until the brakes are in faulty condition before making the necessary adjustments. As the space between the brake lining and the brake drum varies considerably from time to time due to the wear of the brake lining, it has heretofore been the common practice of practically all owners of vehicles to operate the car until the brakes are badly out of adjustment thus often resulting in brakes which do not properly operate and in many cases which do not comply with the laws of many of the States.

Having in mind the difficulties which have heretofore been encountered in keeping the brakes in adjustment, it is the principal object of my invention to provide means operated by the movement of the braking element to automatically compensate for the wear of the brake lining.

A further object is to provide means which will automatically maintain a pre-determined clearance between the brake lining and the brake drum when the braking element is in inoperative position, the adjusting means being operated by the initial engagement of the brake lining with the brake drum.

A further object is to provide a plate having a serrated surface attached to the backing plate, and a member having a corresponding serrated surface movable relative to the plate, the member being moved relative to said plate by movement of the braking element to automatically compensate for the wear of the brake lining.

The above being among the objects of the present invention, the same consists of certain features and combination of parts to be hereinafter described, and then claimed having the above and other objects in view.

Referring to the drawings which show a suitable embodiment of my invention,

Figure 1:
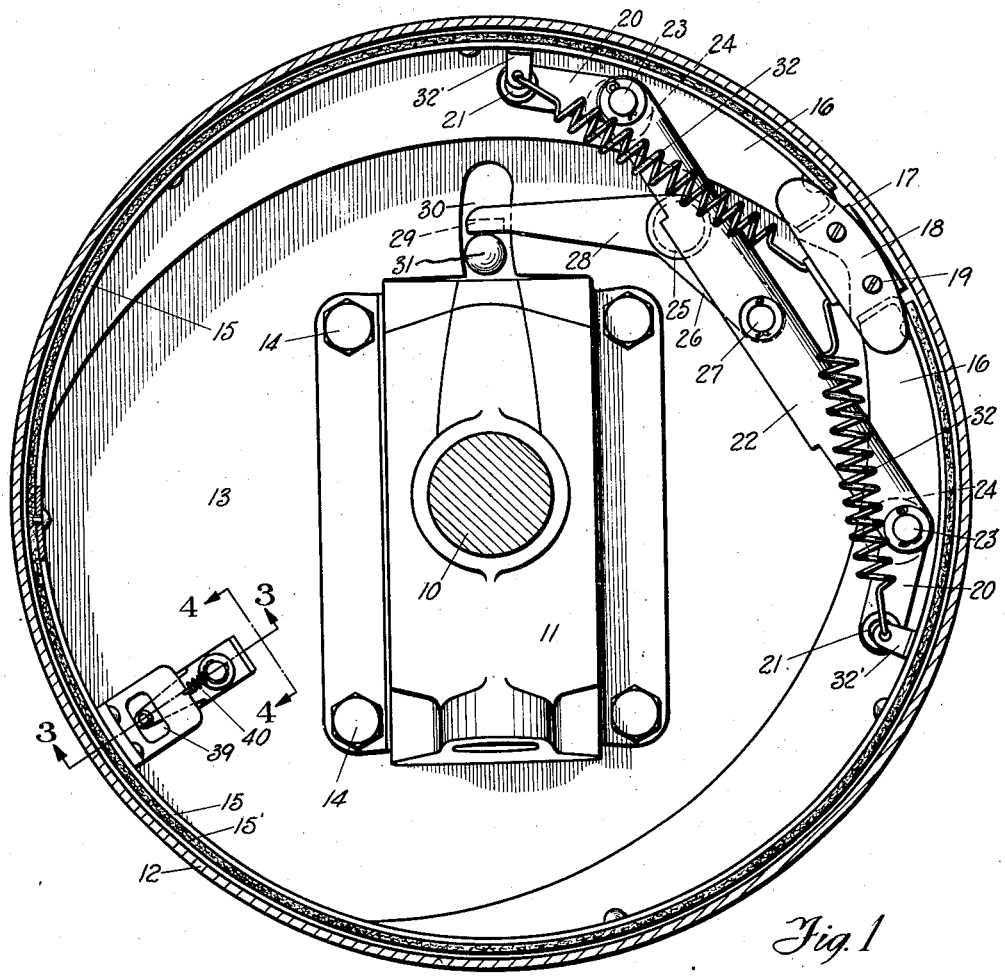
Figure 1 is a side elevation of a vehicle brake including my invention, showing the brake drum and the wheel spindle in section.

Referring to the numbered parts of the drawings in which like numerals refer to like parts throughout the several views, I have shown a stub axle 10 secured to a steering knuckle 11 mounted on a vehicle axle (not shown).

A brake drum 12 mounted in any desired manner on a vehicle wheel is adapted to rotate relative to the axle 10. A dust cover or backing plate 13 is mounted on the steering knuckle 11 and is secured thereto by means of the bolts 14 adjacent to the open end of the brake drum 12 to exclude as much dirt and foreign particles as possible from the brake mechanism.

The brake mechanism which I have shown for the purpose of illustration comprises a free floating brake shoe 15 having its free ends reinforced at 16. A stop 17 is mounted on the backing plate 13 between the free ends of the brake shoe 15 in a manner so that the free ends of the brake shoe normally engage therewith. A plate 18 extending beyond the free ends of the brake shoe 15 is mounted on the stop 17 to prevent transverse movement of the brake shoe 15, the plate 18 and stop 17 to prevent transverse movement of the brake shoe 15, the plate 18 and stop 17 being secured to the backing plate 13 by means of the screws 19.

The brake element chosen for illustration is of the full floating internal expansion type, that is, the type wherein the brake element rotates a substantial amount with the brake drum to apply greater braking effort. The operating means for the brake element is like that shown in my co-pending application Serial No. 334,733 filed on even date herewith and therefore a detailed description of the same is believed to be unnecessary, I will, therefore, refer to the same only briefly to describe the operation of the brake element and its relation to the means adapted to compensate for the wear of the brake lining which is the subject matter of the present invention.

A pair of links 20 are pivoted by means of the pins 21 to the webs or reinforcements 16 of the brake shoe 15. The free ends of the links 20 are interconnected by a U-shaped operating bar 22 pivoted thereto by means of the pivot pins 23. Enlarged openings 24 are formed in the web 16 of the brake shoe 15 for the pins 23 to extend therethrough and move therein. The bar 22 is actuated by means of a bell crank pivoted to the backing plate 13 by a pin 25 and has one arm 26 pivotally attached to the operating bar 22 intermediate its ends by a pin 27. The other bell crank arm 28 terminates in a finger 29 disposed at right angles thereto and extending through a slot 30 cut in the backing plate 13. The finger 29 just mentioned is positioned directly above the steering knuckle king pin and is formed with a flat lower surface.

The means for actuating the brakes may be of the type shown in the application for patent by Andrew P. Wisner, Serial No. 334,707, filed on even date herewith, although any other suitable means may be employed for actuating the brake element as the same forms no part of this invention. I have shown a ball member 31 which can be moved vertically in any desired manner for rocking the bell crank lever on its pivot 25 which in turn will cause the bar 22 to operate the links 20 to first move the brake element 15 bodily relative to the brake drum into initial contact therewith and then expand the same into complete engagement with the brake drum. A pair of springs 32 connected at their adjacent ends to the stop member 17 and at their opposite ends to brackets 32' secured to the brake element 15 are employed to normally retain the brake element 15 in disengagement with the brake drum 12.

The present invention relates to means which automatically compensates for the wear of the brake lining 15' so that a predetermined clearance between the brake drum 12 and the brake lining 15' is at all times insured when the brake element 15 together with the brake lining 15' is in inoperative position.

Referring to Figures 1 to 4 inclusive, I have provided a plate 33 secured to the backing plate 13 which has teeth 34 formed in the exposed face thereof. A support which may be a post 35 is adapted to extend through an opening 36 formed in the plate 33 and through the backing plate 13 to be supported thereby and retained thereon by the nut 37. A bracket 38 having a slot 39 therein is secured to the brake element 15 in line with the support 35 and is connected thereto by means of the spring 40. It will thus be seen that the brake element is normally held out of engagement with the brake drum 15 by means of the spring 40 connected between the bracket 38 and the post 35, and that when the brake element 15 is moved into initial engagement with the brake drum 12, tension is exerted on the spring 40. An arm 41 is mounted on the support 35 and has teeth 42 formed in the face thereof which engage with the teeth 34 formed in the face of the plate 33. The arm 41 is provided with a slot 43 which will permit radial movement thereof relative to the backing plate 13 for a purpose to be hereinafter described.

The arm 41 is resiliently held in engagement with the plate 33 by means of the spring 44 surrounding the support 35 which engages the arm 41 at one end and a stop 45 at its other end positioned on the support 35. The arm 41 has a post 46 extending therefrom on which is mounted a roller 47, the same being retained against longitudinal movement by means of the pin 48 and the collar 49. The roller 47 is adapted to ride in the slot 39 formed in the bracket 38.

Figure 2:
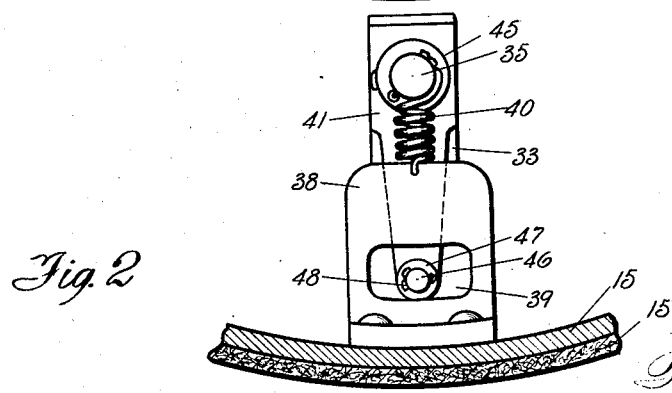
Figure 2 is an enlarged side elevation of the device for compensating for the wear of the brake lining, the brake element and the brake lining being shown in section.
Figure 3:
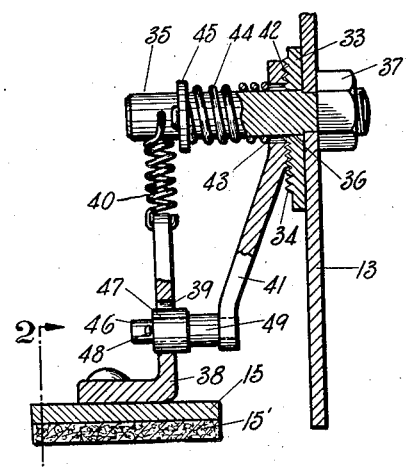
Figure 3 is a section taken on the line 3—3 of Figure 1, certain parts being broken away and others in elevation to more clearly show the invention.
Figure 4:
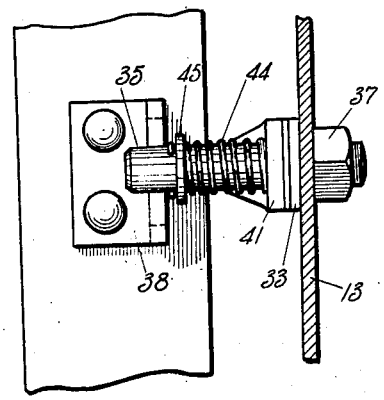
Figure 4 is a section taken on the line 4—4 of Figure 1, showing a top plan view of the brake lining wear compensating device.
Figure 5:
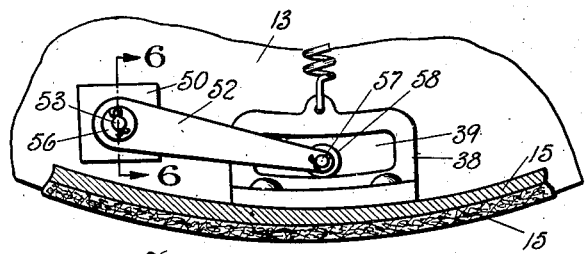
Figure 5 is a side elevation corresponding with Figure 2, showing a modified form of my invention.
Figure 6:
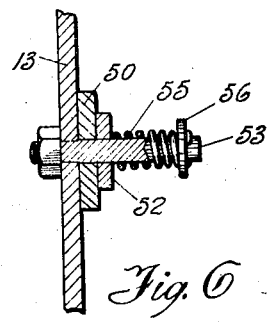
Figure 6 is a section taken on the line 6—6 of Figure 5.
Figure 7:
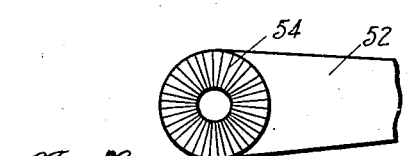
Figure 7 is a fragmentary side elevation of the operating arm shown in Figure 5.
Figure 8:
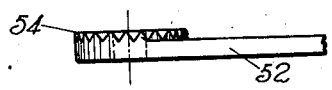
Figure 8 is an edge view of the arm shown in Figure 7.
Figure 9:
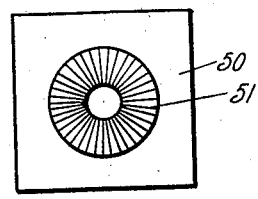
Figure 9 is a face view of the plate adapted to be attached to the backing plate shown in Figure 5.

Referring to Figures 1, 2 and 3, it will be seen that the width of the slot 39 is greater than the diameter of the roller 47 which permits the bracket 38 and, therefore, the brake element 15 to have limited movement relative to the arm 41 without distributing its position on the support 35.

In the assembly of the brake and the brake operating mechanism, the clearance between the brake element and the brake drum is determined and at that time the arm 41 is adjusted on the post 35 so that the roller 47 seats on the edge of the slot 39 as shown in Figure 3 when the brake element is in inoperative position. The clearance between the roller 47 and the opposite edge of the slot 39 is substantially the same as the clearance between the brake lining 15 and the drum 12. Thus it will be seen that as the brake element 15 is moved bodily of the drum 12 the brake lining 15' will have initial engagement with the drum 12 and the roller 47 will have free movement in the slot 39 so that the arm 41 will not be moved by the movement of the bracket 38.

When, however, the brake lining 15' has become worn a slight amount the normal clearance between the same and the brake drum 12 will be increased and therefore a greater initial movement of the brake element 15 is required to apply the brake lining 15' to the drum. In the latter case, the upper edge of the slot 39 will contact with the roller 47 which will move the arm 41 on the support 35 and will thus cause the teeth 42 thereon to ride on the teeth 34 formed in the face of the bracket 33.

When the brake lining has become worn an amount equal to the distance between the apex of the teeth formed on the arm 41 and the bracket 33, the initial movement of the brake element will cause the arm 41 to be moved so that the teeth 42 will engage with the next succeeding tooth 34 in the plate 33. Thus it will be seen that as the brake lining 15' becomes worn the initial movement of the brake element will cause the teeth 42 to ride on the teeth 34 against the tension of the spring 44 to engage the next successive tooth and that such movement will automatically compensate for the wear of the brake lining 15'.

In Figures 5 to 9 inclusive, I have shown a modified form of my invention which comprises a bracket 50 secured to the backing plate 13, the plate 51 having serrations or teeth formed radially thereof. An arm 52 supported on the support 53 has teeth 54 formed radially thereon adapted to engage with the teeth 51 formed on the plate 50. The arm 52 is resiliently held against the plate 50 by means of the spring 55 mounted on the support 53 and engaged between the arm 52 and the stop 56 on the support 53. A post 57 is mounted on the free end of the arm 52 and has a roller 58 supported thereby which is adapted to ride in the slot 39 formed in the bracket 38 in exactly the same manner as the roller 47 carried by the bracket 41 as shown in Figure 3. As the brake lining 15' is moved into initial engagement with the brake drum 12 the roller 58 will be caused to engage with the upper edge of the slot 39 and will therefore cause the teeth 54 thereon to ride on the teeth 51 formed on the bracket 50 and move into engagement with the next successive tooth to compensate for the wear of the brake lining 15'.

Having described my invention it will be apparent that formal changes may be made in the specific embodiment of the invention described without departing from the spirit and substance of the broad invention, the scope of which is commensurate with the appended claims.

What I claim is:

1. A brake comprising, in combination, a drum, a flexible brake element including a friction member engageable with said drum, a stop member positioned between and adapted to be engaged by the free ends of said brake element, means for bodily moving said friction member radially of said drum into partial engagement therewith and then expanding said member into complete engagement therewith, and spring tensioned means positioned opposite the free ends of said brake element operable by the bodily movement of said brake element to resiliently maintain said brake element in a position to automatically compensate for the wear of said friction member.

2. A brake comprising, in combination, a drum, a backing member adjacent thereto, a brake element including a friction member engageable with said drum, means for moving said friction member into engagement with said drum, means to compensate for the wear of said friction member comprising, a plate secured to said backing member, a bracket secured to said brake element, and a member movable by said bracket frictionally engaging said plate on said backing member.

3. A brake comprising, in combination, a drum, a backing member adjacent thereto, a brake element including a friction member engageable with said drum, means for moving said friction member into engagement with said drum, and means to compensate for the wear of said friction member comprising, a plate having a serrated surface secured to said backing member, a slotted bracket secured to said brake element, and a member having a serrated surface engageable with the serrated surface of said plate and having a projecting portion extending into the slot of said bracket whereby said member is moved relative to said plate by movement of said brake element.

4. A brake comprising, in combination, a drum, a backing member adjacent thereto, a brake element including a friction member engageable with said drum, means for moving said friction member into engagement with said drum, and means to compensate for the wear of said friction member comprising, a plate having a serrated surface secured to said backing member, a bracket secured to said brake element, a member engageable with said bracket having a serrated surface adapted to engage the serrated surface of said plate, means to support said member on said backing member, and means to permit movement of said member relative to said plate.

5. A brake comprising, in combination, a drum, a backing member adjacent thereto, a brake element including a friction member engageable with said drum, means for moving said friction member into engagement with said drum, and means to compensate for the wear of said friction member comprising, a plate having a serrated surface secured to said backing member, a support extending through said plate mounted on said backing member, a bracket secured to said brake element, a member engageable with said bracket and having movement relative thereto carried by said support, said member having a serrated surface engageable with the serrated surface of said plate, and means to permit movement of said member relative to said plate.

6. A brake comprising, a drum, a backing member adjacent thereto, a brake element including a friction member engageable with said drum, and means for moving said friction member into engagement with said drum, having in combination therewith, a support mounted on said backing member, a plate mounted on said backing member through which said support extends, a member carried by said support, a spring member mounted on said support for maintaining said member in contact with said plate, and a bracket secured to said braking element having a slot therein adapted to receive said member whereby movement of said braking member causes said member to move relative to said plate against the tension of said spring means to compensate for the wear of said friction member.

7. In a self adjusting brake, a brake shoe, a brake drum, a backing plate, means including a resilient member for moving said brake shoe away from said drum, and stop means for said resilient member, said stop means comprising a serrated portion on the surface of said backing plate, an arm having on one end an extension for engagement with said brake shoe, and on the other end a serrated surface for operative engagement with the serrations on said backing plate.

8. In a self adjusting brake, a brake shoe, a brake drum, a backing plate, means for moving said brake shoe away from said brake drum comprising, a bracket fixed on said brake shoe, a post fixed on said backing plate, resilient means between said bracket and said post, and stop means for said resilient means, said stop means comprising, a serrated portion on the surface of said backing plate, an arm having on one end an extension for engagement with said bracket, and in the other end a slot adapted to surround said post and a serrated surface for operative engagement with the serrations on said backing plate.

9. A self adjusting brake comprising, a brake drum, a brake shoe bodily movable for initial engagement of one portion thereof with said brake drum and expandible for complete engagement with said brake drum, a backing plate, means for contracting said brake shoe, and means for moving the initially engaging portion of said brake shoe away from said brake drum, said last named means comprising, a bracket fixed on said brake shoe, a post fixed on said backing plate, a tension spring extending between said bracket and said post, and a stop member for said spring adjustably mounted on said backing plate and engaging said bracket.

10. A self adjusting brake comprising, a brake drum, a brake shoe bodily movable for initial engagement of one portion thereof with said brake drum and expandible for complete engagement with said brake drum, a backing plate, means for contracting said brake shoe, means for moving the initially engaging portion of said brake shoe away from said brake drum comprising, a bracket on said brake shoe, a post on said backing plate, a tension spring extending between said post and said bracket, and means for automatically limiting the action of said spring, said last named means comprising, a slot in said bracket, a serrated portion on the surface of said backing plate surrounding said post, an arm having an extension in said slot and a serrated surface for engagement with the serrations on said backing plate, and resilient means for retaining the said serrated faces in operative engagement.

Signed by me at South Bend, Indiana, this 21st day of January, 1929.

ROBERT F. KOHR.